United States Patent
Felisati et al.

(10) Patent No.: US 10,577,492 B2
(45) Date of Patent: *Mar. 3, 2020

(54) COMPOSITION COMPRISING PROPYLENE-ETHYLENE-1-BUTENE TERPOLYMERS

(71) Applicant: BASELL POLIOLEFINE ITALIA S.R.L., Milan (IT)

(72) Inventors: Andrea Felisati, Ferrara (IT); Angelo Ferraro, Ferrara (IT); Paola Massari, Ferrara (IT); Marco Ciarafoni, Ferrara (IT); Claudio Cavalieri, Ferrara (IT); Roberto Pantaleoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 132 days.

This patent is subject to a terminal disclaimer.

(21) Appl. No.: 15/750,772

(22) PCT Filed: Jul. 19, 2016

(86) PCT No.: PCT/EP2016/067144
§ 371 (c)(1),
(2) Date: Feb. 6, 2018

(87) PCT Pub. No.: WO2017/021138
PCT Pub. Date: Feb. 9, 2017

(65) Prior Publication Data
US 2018/0237623 A1    Aug. 23, 2018

(30) Foreign Application Priority Data
Aug. 6, 2015   (EP) .................................... 15180040

(51) Int. Cl.
*C08L 23/14*   (2006.01)
*B32B 27/08*   (2006.01)
(Continued)

(52) U.S. Cl.
CPC .............. *C08L 23/14* (2013.01); *B29C 48/08* (2019.02); *B29C 55/12* (2013.01); *B32B 7/04* (2013.01);
(Continued)

(58) Field of Classification Search
CPC ........ C08L 23/14; C08L 23/142; C08L 23/16; C08J 2323/14; C08J 2423/14; C08J 2323/16; C08J 2423/16; B32B 27/32
See application file for complete search history.

(56) References Cited

U.S. PATENT DOCUMENTS

| 4,626,555 A | 12/1986 | Endo et al. |
| 4,769,284 A | 9/1988 | Kakugo et al. |

(Continued)

FOREIGN PATENT DOCUMENTS

| DE | 3539352 A1 | 5/1986 |
| EP | 773 A1 | 2/1979 |

(Continued)

OTHER PUBLICATIONS

International Search Report and Written Opinion dated Nov. 18, 2016 (dated Nov. 18, 2016) for Corresponding PCT/EP2016/067144.

*Primary Examiner* — Kregg T Brooks (57) ABSTRACT

A polyolefin composition made from or containing:
A) from 19 wt % to 50 wt % of a propylene ethylene copolymer having an ethylene derived units content ranging from 1.5 wt % to 6.0 wt;
B) from 50 wt % to 81 wt % of a propylene ethylene 1-butene terpolymer having an ethylene derived units content ranging from 1.5 wt % and 6.0 wt % and 1-butene derived units content of between 4.8 wt % and 12.4 wt %;

(Continued)

wherein
the ratio C2 wt %/C4 wt % is between 0.22 and 3.0, where C2 wt % is the weight percent of ethylene derived units and C4 wt % is the weight percent of 1-butene derived units;
the content of xylene soluble fraction at 25° C. is between 2 and 15 wt %;
molecular weight distribution (MWD), expressed in terms of Mw/Mn, greater than 4.0;
recoverable compliance at 200° C. having a maximum value between 800 and 1200 seconds, lower than $65 \times 10^{-5}$ $Pa^{-1}$.

11 Claims, 1 Drawing Sheet

(51) Int. Cl.

| | | |
|---|---|---|
| *B32B 27/32* | (2006.01) | |
| *B32B 7/04* | (2019.01) | |
| *B32B 27/16* | (2006.01) | |
| *C08J 5/18* | (2006.01) | |
| *C08L 23/16* | (2006.01) | |
| *C08F 210/06* | (2006.01) | |
| *C08F 4/649* | (2006.01) | |
| *C08F 4/642* | (2006.01) | |
| *B29C 55/12* | (2006.01) | |
| *B29C 48/08* | (2019.01) | |

(52) U.S. Cl.
CPC ............... *B32B 27/08* (2013.01); *B32B 27/16* (2013.01); *B32B 27/32* (2013.01); *C08F 4/6421* (2013.01); *C08F 4/6492* (2013.01); *C08F 210/06* (2013.01); *C08J 5/18* (2013.01); *C08L 23/142* (2013.01); *C08L 23/16* (2013.01); *B32B 2307/514* (2013.01); *B32B 2307/518* (2013.01); *B32B 2307/542* (2013.01); *B32B 2307/548* (2013.01); *C08J 2323/14* (2013.01); *C08J 2423/14* (2013.01); *C08J 2423/16* (2013.01); *C08L 2203/16* (2013.01); *C08L 2203/162* (2013.01); *C08L 2205/025* (2013.01); *C08L 2308/00* (2013.01)

(56) References Cited

U.S. PATENT DOCUMENTS

| | | | |
|---|---|---|---|
| 5,623,021 | A | 4/1997 | Pelliconi et al. |
| 6,455,602 | B1 | 9/2002 | Maki et al. |
| 7,022,640 | B2 | 4/2006 | Morini et al. |
| 7,049,377 | B1 | 5/2006 | Morini et al. |
| 2002/0176974 | A1 | 11/2002 | Hanyu et al. |
| 2011/0034634 | A1 | 2/2011 | Grein et al. |
| 2016/0101586 | A1 | 4/2016 | Cho |

FOREIGN PATENT DOCUMENTS

| | | |
|---|---|---|
| EP | 0203727 A2 | 12/1986 |
| EP | 0674991 A1 | 10/1995 |
| EP | 1243612 A2 | 9/2002 |
| EP | 2743307 A1 | 6/2014 |
| EP | 2810773 A1 | 12/2014 |
| JP | S61248740 A | 11/1986 |
| JP | H0848837 A | 2/1996 |
| JP | H0920803 A | 1/1997 |
| JP | 2002309012 A | 10/2002 |
| JP | 2016522763 A | 8/2016 |
| RU | 2470946 C2 | 12/2012 |

# COMPOSITION COMPRISING PROPYLENE-ETHYLENE-1-BUTENE TERPOLYMERS

This application is the U.S. National Phase of PCT International Application PCT/EP2016/067144, filed Jul. 19, 2016, claiming benefit of priority to European Patent Application No. 15180040.6, filed Aug. 6, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polyolefin composition made from or containing a propylene ethylene copolymer and a propylene ethylene 1-butene terpolymer that is useful in film applications.

BACKGROUND OF THE INVENTION

Propylene copolymers or terpolymers are useful for making films.

Propylene copolymers or terpolymers have better impact, lower rigidity and better transparency than propylene homopolymers. In some cases, finding an acceptable balance between these properties is difficult.

Some polyolefin films are characterized by poor wettability, poor printability and poor adhesion to other materials.

In some instances, to render polyolefin films receptive to metallization, coatings, printing inks, lamination, and the like or combinations thereof, surface treatments are used, including corona discharge, flame, plasma, chemical treatment, or treatment by a polarized flame.

SUMMARY OF THE INVENTION

In a general embodiment, the present disclosure provides a polyolefin composition made from or containing a propylene ethylene copolymer and a propylene ethylene 1-butene terpolymer.

In a general embodiment, the present disclosure provides a polyolefin composition made from or containing:
A) from about 19 wt % to about 50 wt %, based upon the total weight of the polyolefin composition, of a propylene ethylene copolymer having an ethylene derived units content ranging from about 1.5 wt % to about 6.0 wt %, based upon the total weight of the propylene ethylene copolymer;
B) from about 50 wt % to about 81 wt %, based upon the total weight of the polyolefin composition, of a propylene ethylene 1-butene terpolymer having an ethylene derived units content ranging from about 1.5 wt % to about 6.0 wt %, based upon the total weight of the propylene ethylene 1-butene terpolymer, and 1-butene derived units content of between about 4.8 wt % and about 12.4 wt %, based upon the total weight of the propylene ethylene 1-butene terpolymer;
the sum of the amount of component A) and B) being 100;
the polyolefin composition being characterized by the following features:
  C2 wt %/C4 wt % ratio of between about 0.22 and about 3.0, where C2 wt % is the weight percent of ethylene derived units and C4 wt % is the weight percent of 1-butene derived units, based upon the total weight of the polyolefin composition;
  xylene soluble fraction at 25° C. between about 2 wt % and about 15 wt %, based upon the total weight of the polyolefin composition;
  molecular weight distribution (MWD), expressed in terms of Mw/Mn, greater than about 4.0;
  recoverable compliance, measured at 200° C., having a maximum value between 800 and 1200 seconds, lower than about $65 \times 10^{-5}$ $Pa^{-1}$.

BRIEF DESCRIPTION OF THE DRAWINGS

The claimed subject matter may be understood by reference to the following description taken in conjunction with the accompanying FIGURE, in which

DETAILED DESCRIPTION OF THE INVENTION

In a general embodiment, the present disclosure provides a polyolefin composition made from or containing:
A) from about 19 wt % to about 50 wt %, alternatively from about 25 wt % to about 42 wt %, alternatively from about 31 wt % to about 38 wt %, based upon the total weight of the polyolefin composition, of a propylene ethylene copolymer having an ethylene derived units content ranging from about 1.5 wt % to about 6.0 wt %, alternatively from about 2.6 wt % to about 5.2 wt %, alternatively from about 3.1 wt % to about 4.3 wt %, based upon the total weight of the propylene ethylene copolymer;
B) from about 50 wt % to about 81 wt %, alternatively from about 58 wt % to about 75 wt %, alternatively from about 62 wt % to about 69 wt %, based upon the total weight of the polyolefin composition, of a propylene ethylene 1-butene terpolymer having an ethylene derived units content ranging from about 1.5 wt % to about 6.0 wt %, alternatively from about 1.9 wt % to about 4.8 wt %, alternatively from about 2.1 wt % to about 3.7 wt %, based on the total weight of the propylene ethylene 1-butene terpolymer, and 1-butene derived units content of between about 4.8 wt % and about 12.4 wt %, alternatively from about 5.1 wt % to about 10.5 wt %, alternatively from about 6.8 wt % to about 10.0 wt %, based upon the total weight of the propylene ethylene 1-butene terpolymer;
the sum of the amount of component A) and B) being 100;
the polyolefin composition being characterized by the following features:
  C2 wt %/C4 wt % ratio of between about 0.22 and about 3.0, alternatively of between about 0.30 and about 2.3, alternatively from about 0.35 to about 1.3, based upon the total weight of the polyolefin composition, where C2 wt % is the weight percent of ethylene derived units and C4 wt % is the weight percent of 1-butene derived units;
  xylene soluble fraction at 25° C. between about 2 and about 15 wt %, alternatively between about 5 and about 13 wt %, alternatively between about 7 and about 11.5 wt %, based upon the total weight of the polyolefin composition;
  molecular weight distribution (MWD), expressed in terms of Mw/Mn, higher than about 4.0, alternatively below about 10.0;
  recoverable compliance, measured at 200° C., having a maximum value between 800 and 1200 seconds, lower than about $65 \times 10^{-5}$ $Pa^{-1}$, alternatively lower than about $60 \times 10^{-5}$ $Pa^{-1}$.

In some embodiments, C2 wt % is between about 2.5 wt % to about 3.9 wt %, based upon the total weight of the polyolefin composition, and C4 wt % is between about 5.3 wt % to about 6.9 wt %, based upon the total weight of the polyolefin composition. In some embodiments, the Melt Flow Rate (MFR 230° C. 2.16 kg) of the polyolefin composition, as a reactor grade, ranges from about 0.5 to about 75 g/10 min, alternatively from about 1.0 to about 25.0 g/10 min, alternatively from about 3.0 to about 20.0 g/10 min, alternatively from about 4.0 to about 18.0 g/10 min. In the present description, the term "reactor grade" as used herein refers to a polyolefin composition that has not been subjected to chemical or physical visbreaking.

In some embodiments, the polyolefin composition has a melting temperature lower than about 140° C., alternatively lower than about 136.8° C.

In some embodiments, the polyolefin composition has a seal initiation temperature (SIT) between about 90 and about 109° C.

In the present description, the term "propylene ethylene copolymer" as used herein refers to a polymer containing propylene and ethylene comonomers. In the present description, the term "propylene ethylene 1-butene terpolymer" as used herein refers to a polymer containing propylene, ethylene and 1-butene comonomers.

In a general embodiment, the polyolefin composition is useful for the production of films. In some embodiments, the films are biaxially oriented (BOPP) films. In some embodiments, the BOPP film obtained with the polyolefin composition has increased surface tension after corona treatment.

In a general embodiment, the polyolefin composition herein disclosed is prepared by a process including polymerizing propylene with ethylene and propylene with ethylene and 1-butene, in the presence of a catalyst made from or containing the product of the reaction between:
(i) a solid catalyst component made from or containing Ti, Mg, Cl, and an electron donor compound (internal donor);
(ii) an alkylaluminum compound and,
(iii) an electron-donor compound (external donor).

In some embodiments, the particles of solid component have substantially spherical morphology and average diameter ranging between about 5 µm and about 150 alternatively from about 20 µm to about 100 alternatively from about 30 µm to about 90 In the present description, the term "substantially spherical morphology" as used herein refers to particles having the ratio between the greater axis and the smaller axis equal to or lower than about 1.5, alternatively lower than about 1.3.

In some embodiments, the amount of Mg ranges from about 8 to about 30 weight %, alternatively from about 10 wt % to about 25 wt %, based upon the total weight of the solid catalyst component.

In some embodiments, the amount of Ti ranges from about 0.5 wt % to about 5 wt %, alternatively from about 0.7 wt % to about 3 wt %, based upon the total weight of the solid catalyst component.

In some embodiments, internal electron donor compounds are 1,3-diethers of formula:

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, the structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above described substituents that can also be bonded to the condensed cyclic structures; one or more of the above described alkyl, cycloalkyl, aryl, aralkyl, or alkaryl radicals and the condensed cyclic structures optionally containing one or more heteroatom(s) as substitutes for carbon or hydrogen atoms, or both.

In some embodiments, the ethers are as described in European Patent Application Nos. 361493 and 728769, incorporated herein by reference.

In some embodiments, the diethers are selected from the group consisting of 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis(methoxymethyl) fluorene.

In some embodiments, the Mg/Ti molar ratio is equal to, or higher than, about 13, alternatively in the range from about 14 to about 40, alternatively from about 15 to about 40. In some embodiments, the Mg/donor molar ratio is higher than about 16, alternatively higher than about 17, alternatively from about 18 to about 50.

In some embodiments, the solid catalyst component is prepared by reacting a titanium compound of formula $Ti(OR)_{q-y}X_y$, where q is the valence of titanium and y is a number between 1 and q, with a magnesium chloride deriving from an adduct of formula $MgCl_2 \cdot pROH$, where p is a number between about 0.1 and about 6, alternatively from about 2 to about 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct thereby creating an emulsion which is quickly quenched causing the solidification of the adduct in form of spherical particles. In some embodiments, the procedure for the preparation of the spherical adducts are as disclosed in U.S. Pat. Nos. 4,399,054 and 4,469,648, incorporated herein by reference. In some embodiments, the adduct is reacted with Ti compound or subjected to thermal controlled dealcoholation (80-130° C.), thereby obtaining an adduct in which the number of moles of alcohol is lower than about 3, alternatively between about 0.1 and about 2.5. In some embodiments, the reaction with the Ti compound is carried out by suspending the adduct (dealcoholated or as such) in cold $TiCl_4$; the mixture is heated up to 80-130° C. and kept at this temperature for 0.5-2 hours. In some embodiments, the temperature of the cold $TiCl_4$ is about 0° C. In some embodiments, the treatment with $TiCl_4$ is carried out one or more times. In some embodiments, the internal electron donor compound is added during the treatment with $TiCl_4$.

In some embodiments, the alkylaluminum compound (ii) is selected from the group consisting of trialkyl aluminum compounds. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, the alkylaluminum compound (ii) is selected from the group consisting of alkylaluminum halides, alkylaluminum hydrides and alkylaluminum sesquichlorides, optionally in mixture with trialkyl aluminum compounds. In some embodiments, the alkylaluminum sesquichlorides are selected from the group consisting of $AlEt_2Cl$ and $Al_2Et_3Cl_3$. In some embodiments, the Al/Ti ratio is higher than about 1, alternatively between about 50 and about 2000.

In some embodiments, the external electron-donor compounds are selected from the group consisting of silicon compounds, ethers, esters, amines, heterocyclic compounds and ketones. In some embodiments, the external electron-donor compound is 2,2,6,6-tetramethylpiperidine.

In some embodiments, the external donor compounds are silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$ are alkyl, cycloalkyl or aryl radicals with 1-18 carbon atoms optionally containing heteroatoms. In some embodiments, the silicon compounds have a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group. In some embodiments, $R_8$ is a methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyl dimethoxysilane, (2-ethylpiperidinyl)thexyldimethoxysilane, (3,3,3-trifluoro-n-propyl)-(2-ethylpiperidinyl)-dimethoxysilane, and methyl(3,3,3-trifluoro-n-propyl) dimethoxysilane. In some embodiments, the silicon compounds have a is 0, c is 3, $R_7$ is a branched alkyl or cycloalkyl group, optionally containing heteroatoms, and $R_8$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (iii) is used in such an amount to give a molar ratio between the organoaluminum compound and the electron donor compound (iii) of from about 0.1 to about 500, alternatively from about 1 to about 300, alternatively from about 3 to about 100.

In some embodiments, the polymerization process is carried out with slurry polymerization using as diluent an inert hydrocarbon solvent, or bulk polymerization using the liquid monomer as a reaction medium. In some embodiments, the liquid monomer for bulk polymerization is propylene. In some embodiments, the polymerization process is carried out in gas-phase operating in one or more fluidized or mechanically agitated bed reactors.

In some embodiments, the polymerization is carried out at temperature of from 20 to 120° C., alternatively from 40 to 80° C. In some embodiments, the polymerization is carried out in gas-phase with the operating pressure is between about 0.5 and about 5 MPa, alternatively between about 1 and about 4 MPa. In some embodiments, the polymerization is carried out in the bulk polymerization with the operating pressure is between about 1 and about 8 MPa, alternatively between about 1.5 and about 5 MPa. In some embodiments, hydrogen is used as a molecular weight regulator.

The polyolefin composition of the present disclosure may also contain the additives for the film manufacturing, including antioxidants, process stabilizers, slip agents, antistatic agents, and antiblock agents.

In a general embodiment, the polyolefin composition is used to prepare mono- or multilayer films.

In some embodiments, extrusion processes are used.

In extrusion processes the polymer material to be used is molten in an extruder and extruded through a narrow die slit. In some embodiments, subsequent from the exit from the die, the polymer material is cooled, heated and optionally oriented in several ways or in combination.

In some embodiments, the processes are selected from the group consisting of cast, blown, extrusion coating, uniaxially oriented, simultaneous biaxially oriented and sequential biaxially oriented film processes.

In some embodiments, the processes are selected from the group consisting of blown film and BOPP processes.

The following examples are illustrative and not intended to limit the scope of this disclosure in any way.

EXAMPLES

Characterizations

Determination of Xylene Soluble fraction 2.5 g of polymer and 250 mL of o-xylene were introduced in a glass flask equipped with a refrigerator and a magnetic stirrer. The temperature was raised in 30 minutes up to the boiling point of the solvent. The solution was then kept under reflux and stirring for further 30 minutes. The closed flask was then kept for 30 minutes in a bath of ice and water and in thermostatic water bath at 25° C. for 30 minutes. The solid was filtered on quick filtering paper and 100 ml of the filtered liquid was poured in a pre-weighed aluminum container, which was then heated on a heating plate under nitrogen flow, to remove the solvent by evaporation. The container was then kept in an oven at 80° C. under vacuum until constant weight was obtained. The residue was weighed to determine the percentage of xylene-soluble polymer.

Molecular Weight Distribution MWD (Mw/Mn)

Molecular weights and molecular weight distribution were measured at 150° C. using a Waters Alliance GPCV/2000 instrument equipped with four mixed-bed columns PLgel Olexis having a particle size of 13 μm. The dimensions of the columns were 300×7.8 mm. The mobile phase used was vacuum distilled 1,2,4-trichlorobenzene (TCB) and the flow rate was kept at 1.0 ml/min. The sample solution was prepared by heating the sample under stirring at 150° C. in TCB for one to two hours. The concentration was 1 mg/ml. To prevent degradation, 0.1 g/l of 2,6-di-tert-butyl-p-cresol were added. 300 μl (nominal value) of solution were injected into the column set. A calibration curve was obtained using 10 polystyrene standard samples (EasiCal kit by Agilent) with molecular weights in the range from 580 to 7 500 000 Da. It was assumed that the K values of the Mark-Houwink relationship were:

$K=1.21\times10^{-4}$ dl/g and $a=0.706$ for the polystyrene standards, $K=1.90\times10^{-4}$ dl/g and $a=0.725$ for the experimental samples.

A third order polynomial fit was used to interpolate the experimental data and obtain the calibration curve. Data acquisition and processing was done by using Waters Empowers 3 Chromatography Data Software with GPC option.

Melt Flow Rate (MFR)

The melt flow rate MFR of the polymer composition was determined according to ISO 1133 (230° C., 2.16 Kg).

Determination of the Comonomer Content

The comonomers content was determined by infrared spectroscopy by collecting the IR spectrum of the sample vs. an air background with a Fourier Transform Infrared spectrometer (FTIR); the instrument data acquisition parameters were:

purge time: 30 seconds minimum
collect time: 3 minutes minimum
apodization: Happ-Genzel
resolution: 2 $cm^{-1}$.

Sample Preparation:

Using a hydraulic press, a thick sheet was obtained by pressing about 1 g of sample between two aluminum foils. When homogeneity was in question, a minimum of two pressing operations were performed. A small portion was cut from the sheet to mold a film. The film thickness was between 0.02 and 0.05 cm (8-20 mils).

Pressing temperature was 180±10° C. (356° F.) and about 10 kg/$cm^2$ (142.2 PSI) pressure.

After about 1 minute the pressure was released and the sample was removed from the press and cooled to room temperature.

The spectrum of a pressed film of the polymer was recorded in absorbance vs. wavenumbers ($cm^{-1}$). The following measurements were used to calculate ethylene and 1-butene content:

Area (At) of the combination absorption bands between 4482 and 3950 $cm^{-1}$ was used for spectrometric normalization of film thickness.

AC2 was the area of the absorption band between 750-700 $cm^{-1}$ after two proper consecutive spectroscopic subtractions of an isotactic non additivate polypropylene spectrum and then of a reference spectrum of a 1-butene-propylene random copolymer in the range 800-690 $cm^-$.

DC4 was the height of the absorption band at 769 $cm^{-1}$ (maximum value), after two proper consecutive spectroscopic subtractions of an isotactic non additivate polypropylene spectrum and then of a reference spectrum of an ethylene-propylene random copolymer in the range 800-690 $cm^-$.

To calculate the ethylene and 1-butene content, calibration straights lines for ethylene and 1-butene were obtained from standards containing ethylene and 1-butene.

Calibration of Ethylene:

Calibration straight line GC2 was obtained by plotting AC2/At versus ethylene molar percent (% C2m). The slope of GC2 was calculated from a linear regression.

Calibration of 1-butene:

Calibration straight line GC4 was obtained by plotting DC4/At versus 1-butene molar percent (% C4m). The slope of GC4 was calculated from a linear regression.

Spectrum of the sample was recorded and then (At), (AC2) and (DC4) of the sample were calculated. The ethylene content (% molar fraction C2m) of the sample was calculated as follows:

$$\% \ C2m = \frac{1}{G_{C2}} \cdot \frac{A_{C2}}{A_t}$$

The 1-butene content (% molar fraction C4m) of the sample was calculated as follows:

$$\% \ C4m = \frac{1}{G_{C4}} \cdot \left( \frac{A_{C4}}{A_t} - I_{C4} \right)$$

The propylene content (molar fraction C3m) was calculated as follows:

$C3m=100-\%C4m-\%C2m$

The ethylene, 1-butene contents by weight were calculated as follows:

$$\% \ C2\text{wt} = 100 \cdot \frac{28 \cdot C2m}{(56 \cdot C4m + 42 \cdot C3m + 28 \cdot C2m)}$$

$$\% \ C4\text{wt} = 100 \cdot \frac{56 \cdot C4m}{(56 \cdot C4m + 42 \cdot C3m + 28 \cdot C2m)}$$

Melting Temperature Via Differential Scanning Calorimetry (DSC)

The melting temperature of the polymers (Tm) was measured by Differential Scanning calorimetry (D.S.C.) on a Perkin Elmer DSC-1 calorimeter, calibrated against indium melting point, and according to ISO 11357-1, 2009 and 11357-3, 2011, at 20° C./min. The weight of the samples in DSC crucibles was kept at 6.0±0.5 mg.

To obtain the melting point, the weighed sample was sealed into aluminum pans and heated to 200° C. at 20° C./minute. The sample was kept at 200° C. for 2 minutes, then cooled to 5° C. at 20° C./minute. After standing 2 minutes at 5° C., the sample was heated for the second run time to 200° C. at 20° C./min. In this second heating run, the peak temperature (Tp,m) was taken as the melting temperature.

Determination of Haze

An about 5×5 cm 50 μm thick film specimen was prepared by extruding each test composition in a single screw Collin extruder (length/diameter ratio of screw 1:25) at a film drawing speed of 7 m/min and a melt temperature of 210-250° C. The haze value was measured using a Gardner photometric unit connected to a Hazemeter type UX-10 or an equivalent instrument having G.E. 1209 light source with filter "C". Reference specimen were used for calibrating the instrument.

Determination of the Surface Tension

The determination of the surface tension was measured according to ASTM D2578-09.

Seal Initiation Temperature (SIT)

Preparation of the Film Specimens:

An A/B/C multilayer film was prepared with the A layer being the polymer of Example 1, the B layer being a propylene homopolymer MOPLEN HP522H sold by LyondellBasell and the C layer being the polymer of Comparative Example 2. The processing parameters are reported in Table 1.

TABLE 1

| | Layer thickness μm | Melt temperature ° C. | Line speed m/min |
|---|---|---|---|
| Layer A Internal sealing later | 1 | 244 | 36 |
| Layer B Core | 28 | 263 | |
| Layer C Outside layer | 1 | 259 | |

The multilayer film was stretched with a ratio 5.1:1.

For comparison, also a C/B/C multilayer film, wherein the C layer being the polymer of Comparative Example 2 and the B layer being a propylene homopolymer MOPLEN HP522H sold by LyondellBasell, was produced. The processing parameters are reported in Table 2.

TABLE 2

|  |  | Layer thickness μm | Melt temperature ° C. | Line speed m/min |
|---|---|---|---|---|
| Layer C | Internal sealing later | 1 | 259 | 36 |
| Layer B | Core | 28 | 263 |  |
| Layer C | Outside layer | 1 | 259 |  |

Determination of the SIT:

For each test, two of the specimens were superimposed in alignment, the adjacent layers being layers of the test composition. The superimposed specimens were sealed along one of the 2 cm sides with a Brugger Feinmechanik Sealer, model HSG-ETK 745. Sealing time was 5 seconds at a pressure of 0.1 N/mm$^2$. The sealing temperature was increased 1° C. for each seal, starting from about 30° C. less than the melting temperature of the composition. The sealed samples were left to cool and then the unsealed ends were attached to an Instron machine where the samples were tested at a traction speed of 50 mm/min.

The SIT was the minimum sealing temperature at which the seal did not break when a load of at least 2 Newton was applied in the test conditions.

Determination of the Recoverable Compliance

Recoverable compliance was determined with creep and recovery measurements by using a Physica MCR301 rheometer having a cone plate geometry of 25 mm of radius and an angle of measuring cone of 1.992° grades with the cone plate on the top. The temperature of the tests was 200° C.

Determination of the Creep Time

The complex viscosity was determined in a frequency sweep test from 100 rad/s to 0.01 rad/s at constant strain of 5% and the value at frequency of 0.01 rad/s was used to calculate the creep time (no time setting in the profile). The creep time was then calculated by using the formula: Creep time=complex viscosity@0.01 rad/s/100; [1] wherein 100 was the applied stress in Pascal.

Determination of Recovery Time

The recovery time was calculated according to the following formula:

Recovery time=Creep time*7[2]

Creep and Recovery Test a) creep

The creep was measured once a second for a maximum of seconds according to the creep time calculated in [1]. The shear stress applied was 100 Pa;

b) recovery

The recovery was measured once a second for a maximum of seconds according to the recovery time calculated in [2]. The shear stress applied was 0 Pa.

At the end of the test the software calculated the recoverable compliance, measured in Pa$^{-1}$, vs time, measured in seconds.

Example 1

Procedure for the Preparation of the Spherical Adduct

Microspheroidal MgCl$_2$.2.1 C$_2$H$_5$OH adduct was prepared according to Example 1 of European Patent Application No. 728769, incorporated herein by reference.

Procedure for the Preparation of the Solid Catalyst Component

The solid catalyst component was prepared according to Example 1 of European Patent Application No. 728769, incorporated herein by reference.

Prepolymerization Treatment

Before introducing the solid catalyst component into the polymerization reactors, the solid catalyst component was contacted with triethylaluminum (TEAL) and dicyclopentyldimethoxysilane (DCPMS, D donor) in a ratio reported in Table 2.

Then, the resulting mixture was subjected to prepolymerization by maintaining the mixture in suspension in liquid propylene at 20° C. for about 5 minutes before introducing the mixture into the first polymerization reactor.

Polymerization

Into a first gas phase polymerization reactor a propylene ethylene copolymer was produced by feeding in a continuous and constant flow the prepolymerized catalyst system, hydrogen (when used as a molecular weight regulator), propylene, and ethylene, in the gas state.

The polymer produced in the first reactor was discharged in a continuous flow and, after been purged of unreacted monomers, was introduced, in a continuous flow, into a second gas phase polymerization reactor, together with quantitatively constant flows of hydrogen (when used), 1-butene, ethylene and propylene, in the gas state.

The polymer particles exiting the second reactor were subjected to a steam treatment to remove the reactive monomers and volatile substances, and then dried.

The main polymerization conditions are reported in Table 3. The polymer features are reported on Table 4.

TABLE 3

|  |  | Example 1 |
|---|---|---|
| catalyst feed | g/h | 10 |
| TEAL/solid catalyst component weight ratio | g/g | 4.0 |
| TEAL/DCPMS weight ratio | g/g | 4.0 |
| first gas phase reactor |  |  |
| Polymerisation temperature | ° C. | 70 |
| Pressure | barg | 18.0 |
| Residence time | min | 53 |
| C2 | wt % | 3.2 |
| H2/C3 | mol/mol | 0.007 |
| C2/(C2 + C3) | mol/mol | 0.032 |
| split first reactor (amount A) | wt % | 35 |
| second gas phase reactor |  |  |
| Polymerisation temperature | ° C. | 75 |
| Pressure | barg | 16.0 |
| Residence time | min | 52 |
| H2/C3 | mol/mol | 0.022 |
| C2/C2 + C3 | mol/mol | 0.041 |
| C4/C4 + C3 | mol/mol | 0.18 |
| split second reactor (amount B) | wt % | 65 |

C2 = ethylene;
C3 = propylene;
C4 = 1-butene;
H2 = hydrogen

Comparative Example 2 was a commercial product sold by LyondellBasell having the features reported in Table 4 and being produced with a catalyst with diisobutylphthalate instead of 9,9-bis(methoxymethyl)fluorene as internal donor.

Figure 1:
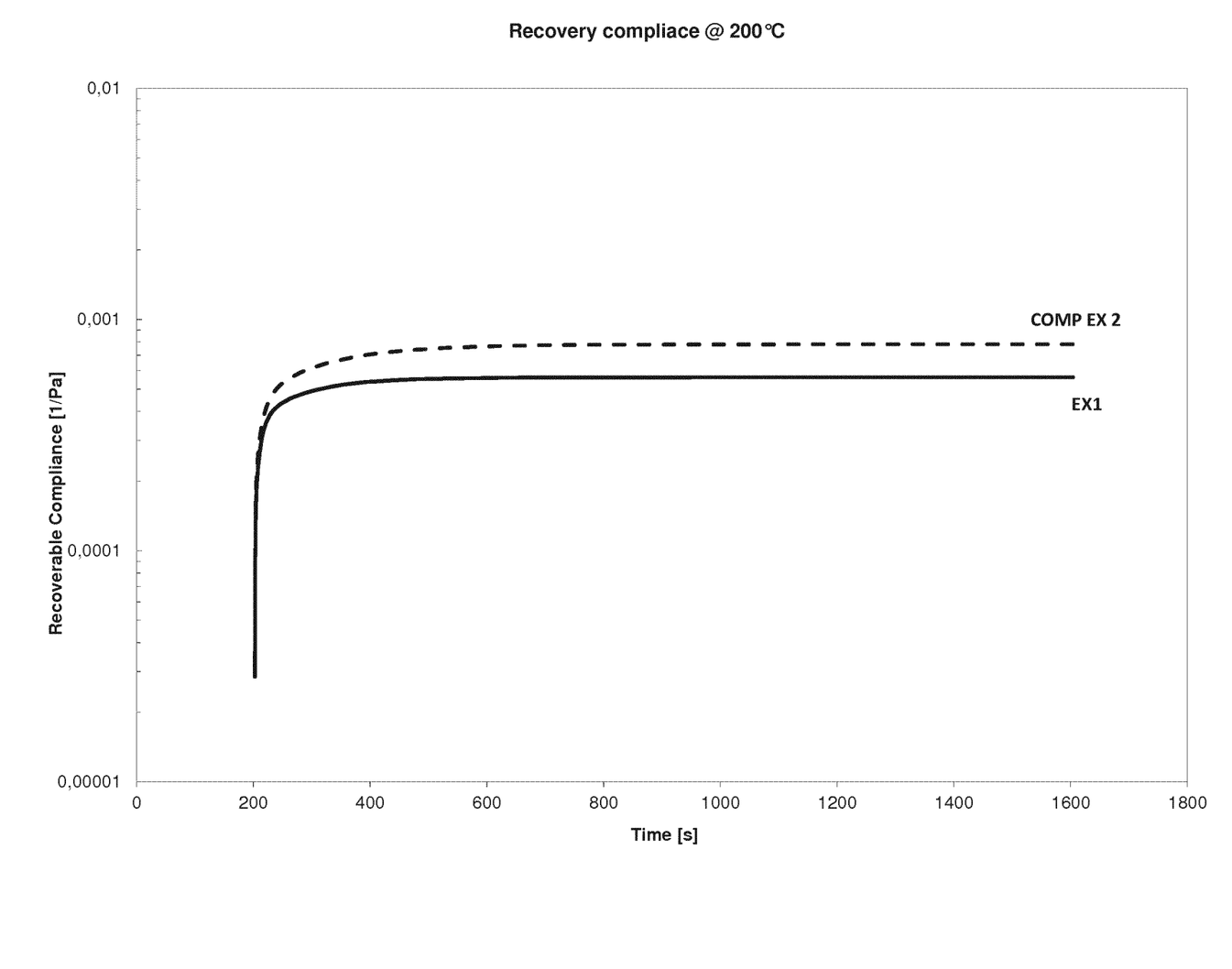
FIG. 1 is a graph of recovery compliance versus time measured at 200° C., of Example 1 and Comparative Example 2.

Recovery compliance curves of both Example 1 and Comparative Example 2 are reported in FIG. 1. The maximum value of the two curves between 800 and 1200 seconds is reported in Table 4.

TABLE 4

|  |  | Example 1 | Comparative Example 2 |
|---|---|---|---|
| MFR | g/10 min | 5.9 | 5.3 |
| C2 content (IR) in A | wt % | 3.2 | 3.3 |
| Split first reactor (amount A) | wt % | 35 | 35 |
| C2 content (IR) total | wt % | 3.2 | 3.3 |
| C4 content (IR) total | wt % | 6.6 | 5.9 |
| C2/C4 |  | 0.48 | 0.56 |
| Xylene Soluble 0°/25° | wt % | 9.5 | 8.7 |
| Tm | ° C. | 132.4 | 130.5 |
| Mw/Mn |  | >4 | >4 |
| SIT | ° C. | 105 | 105 |
| Haze | % | 0.17 | 0.20 |
| Maximum recoverable compliance between 800 and 1200 s | 1/Pa | $56 \times 10^{-5}$ | $78 \times 10^{-5}$ |

Sample of the obtained films were subjected to a corona treatment and then the surface tension was measured at different time. The results are reported in Table 4.

TABLE 4

| Surface tension after corona treatment | mN/m | Example 1 | Comparative Example 2 |
|---|---|---|---|
| After 9 day |  | 45 | 44 |
| After 14 days |  | 45 | 44 |
| After 21 days |  | 45 | 42 |
| After 27 days |  | 44 | 42 |
| After 56 days |  | 43 | 40 |

What is claimed is:

1. A polyolefin composition comprising:
A) from about 19 wt % to about 50 wt %, based upon the total weight of the polyolefin composition, of a propylene ethylene copolymer having an ethylene derived units content ranging from about 1.5 wt % to about 6.0 wt %, based upon the total weight of the propylene ethylene copolymer;
B) from about 50 wt % to about 81 wt %, based upon the total weight of the polyolefin composition, of a propylene ethylene 1-butene terpolymer having an ethylene derived units content ranging from about 1.5 wt % and about 6.0 wt %, based on the total weight of the propylene ethylene 1-butene terpolymer, and 1-butene derived units content of between about 4.8 wt % and about 12.4 wt %, based on the total weight of the propylene ethylene 1-butene terpolymer;
the sum of the amount of component A) and B) being 100 wt %;
the polyolefin composition being characterized by the following features:
the ratio C2 wt %/C4 wt % between about 0.22 and about 2.5, based upon the total weight of the polyolefin composition, where C2 wt % is the weight percent of ethylene derived units and C4 wt % is the weight percent of 1-butene derived units;
the content of xylene soluble fraction at 25° C. between about 2 and about 15 wt %, based upon the total weight of the polyolefin composition;
molecular weight distribution (MWD), expressed in terms of Mw/Mn, greater than about 4.0;
recoverable compliance at 200° C. having a maximum value between 800 and 1200 seconds of total creep and recovery time, lower than about $65 \times 10^{-5}$ Pa$^{-1}$.

2. The polyolefin composition according to claim 1 wherein component A) ranges from about 25 wt % to about 42 wt %, based upon the total weight of the polyolefin composition, and component B) ranges from about 58 wt % to about 75 wt %, based upon the total weight of the polyolefin composition.

3. The polyolefin composition according to claim 1, wherein the ethylene derived units content in component A) ranges from about 2.6 wt % to about 5.2 wt %, based upon the total weight of the propylene ethylene copolymer.

4. The polyolefin composition according to claim 1, wherein the ethylene derived units content in component B) ranges from about 1.9 wt % to about 4.8 wt %, based on the total weight of the propylene ethylene 1-butene terpolymer, and the 1-butene derived units content ranges from about 5.1 wt % to about 10.5 wt %, based on the total weight of the propylene ethylene 1-butene terpolymer.

5. The polyolefin composition according to claim 1, wherein the recoverable compliance at 200° C. has a maximum value between 800 and 1200 seconds lower than about $60 \times 10^{-5}$ Pa$^{-1}$.

6. The polyolefin composition according to claim 1, wherein the ethylene derived units content ranges from about 2.5 wt % to about 3.9 wt %, based upon the total weight of the polyolefin composition.

7. The polyolefin composition according to claim 1, wherein the 1-butene derived units content ranges from about 5.3 wt % to about 6.9 wt %, based upon the total weight of the polyolefin composition.

8. The polyolefin composition according to claim 1, wherein the melting temperature is lower than about 136.8° C.

9. The polyolefin composition according to claim 1, wherein the seal initiation temperature (SIT) is between about 90 and about 109° C.

10. A film comprising:
(i) a polyolefin composition comprising:
A) from about 19 wt % to about 50 wt %, based upon the total weight of the polyolefin composition, of a propylene ethylene copolymer having an ethylene derived units content ranging from about 1.5 wt % to about 6.0 wt %, based upon the total weight of the propylene ethylene copolymer;
B) from about 50 wt % to about 81 wt %, based upon the total weight of the polyolefin composition, of a propylene ethylene 1-butene terpolymer having an ethylene derived units content ranging from about 1.5 wt % and about 6.0 wt %, based on the total weight of the propylene ethylene 1-butene terpolymer, and 1-butene derived units content of between about 4.8 wt % and about 12.4 wt %, based on the total weight of the propylene ethylene 1-butene terpolymer;
the sum of the amount of component A) and B) being 100 wt %;
the composition being characterized by the following features:
the ratio C2 wt %/C4 wt % between about 0.22 and about 2.5, based upon the total weight of the polyolefin composition, where C2 wt % is the weight percent of ethylene derived units and C4 wt % is the weight percent of 1-butene derived units;
the content of xylene soluble fraction at 25° C. between about 2 and about 15 wt %, based upon the total weight of the polyolefin composition;
molecular weight distribution (MWD), expressed in terms of Mw/Mn, greater than about 4.0;
recoverable compliance at 200° C. having a maximum value between 800 and 1200 seconds of total creep and recovery time, lower than about $65 \times 10^{-5}$ Pa$^{-1}$.

11. The film according to claim 10, wherein the film is a biaxially oriented (BOPP) film.

\* \* \* \* \*

UNITED STATES PATENT AND TRADEMARK OFFICE
CERTIFICATE OF CORRECTION

PATENT NO. : 10,577,492 B2
APPLICATION NO. : 15/750772
DATED : March 3, 2020
INVENTOR(S) : Felisati et al.

It is certified that error appears in the above-identified patent and that said Letters Patent is hereby corrected as shown below:

On the Title Page

Column 1, Item (30), Line 1, delete "1518004" and insert -- 15180040.6 --, therefor Signed and Sealed this
First Day of November, 2022

Katherine Kelly Vidal
*Director of the United States Patent and Trademark Office*